(12) United States Patent
Popelka et al.

(10) Patent No.: US 7,356,531 B1
(45) Date of Patent: Apr. 8, 2008

(54) NETWORK FILE SYSTEM RECORD LOCK RECOVERY IN A HIGHLY AVAILABLE ENVIRONMENT

(75) Inventors: Paul L. Popelka, Cupertino, CA (US); Manish M. Agarwal, Mountain View, CA (US)

(73) Assignee: Symantec Operating Corporation, Mountain View, CA (US)

( * ) Notice: Subject to any disclaimer, the term of this patent is extended or adjusted under 35 U.S.C. 154(b) by 838 days.

(21) Appl. No.: 10/627,258

(22) Filed: Jul. 25, 2003

(51) Int. Cl.
*G06F 17/30* (2006.01)
*G06F 15/173* (2006.01)
*G06F 11/00* (2006.01)

(52) U.S. Cl. ............... 707/8; 714/4; 709/225
(58) Field of Classification Search ............ 707/8, 707/9, 200, 201, 202; 709/225; 714/1, 2, 714/3, 4; 710/200
See application file for complete search history.

(56) References Cited

U.S. PATENT DOCUMENTS

| | | | |
|---|---|---|---|
| 6,367,029 B1* | 4/2002 | Mayhead et al. ............... | 714/2 |
| 6,625,750 B1* | 9/2003 | Duso et al. .................... | 714/11 |
| 2003/0018927 A1* | 1/2003 | Gadir et al. ................... | 714/4 |
| 2003/0065686 A1* | 4/2003 | Callahan et al. ............. | 707/200 |
| 2003/0079155 A1* | 4/2003 | Kingsbury ...................... | 714/2 |
| 2005/0071470 A1* | 3/2005 | O'Brien et al. ............. | 709/226 |

OTHER PUBLICATIONS

Devarakonda et al, "Recovery in the Calypso File System", ACM Transactions on Computer Systems, vol. 14, No. 3, Aug. 1996, pp. 287-310.*
Thekkath et al, "Frangipani: A Scalable Distributed File System", ACM 1997, pp. 224-237.*
"NFS Lock Recovers in Solaris," Phase One Interactive, 1995, 4 pages.
"File Locking Over XNFS," Protocols for Interworking: XNFS, Version 3W, The Open Group, 1998, 8 pages.
"Network Lock Manager Protocol," Protocols for Interworking: XNFS, Verstion 3W, The Open Group, 1998, 84 pages.
"RFC 3530," NFS Version 4 Protocol, Apr. 2003, 45 pages.
"VERITAS Cluster Server 3.5," Agent Developer's Guide, Solaris, Jul. 2002, 16 pages.
"NFS Illustrated," Brent Callaghan, Addison-Wesley Professional Computing Series, 2000, pp. 277-319.

* cited by examiner

*Primary Examiner*—Uyen Le
(74) *Attorney, Agent, or Firm*—Lawrence J Merkel; Meyertons, Hood, Kivlin, Kowert & Goetzel, P.C.

(57) ABSTRACT

A computer accessible medium may be encoded with a plurality of instructions which, when executed in a first node of a plurality of nodes in response to a fail over of a first service group of a plurality of service groups from a second node of the plurality of nodes, initiate lock recovery for locks on one or more filesystems included in the service group. Locks on one or more filesystems in a second service group of the plurality of service groups may be maintained during a time period that locks in the first service group are recovered. The lock recovery may be initiated using a first client list of a plurality of client lists, wherein the first client list is included in the first service group and identifies clients having at least one lock on a filesystem included in the first service group. During the fail over of a service group, lock services may not be interrupted for other service groups on any of the nodes.

37 Claims, 10 Drawing Sheets

NETWORK FILE SYSTEM RECORD LOCK RECOVERY IN A HIGHLY AVAILABLE ENVIRONMENT

BACKGROUND OF THE INVENTION

1. Field of the Invention

This invention is related to the field of filesystems and, more particularly, to handling record locks implemented by network file systems in a highly available environment.

2. Description of the Related Art

One approach to providing access to a filesystem for networked computer systems is a network filesystem. In a network filesystem, a server exports a filesystem for use by clients. A filesystem may be referred to as "exported" if the filesystem has been made available, according to the network filesystem protocol, for clients to access. The clients import the filesystem, and present the filesystem to the user in a fashion similar to the local filesystem on the clients. Examples of network filesystems are the Network Filesystem (NFS), the Andrew Filesystem (AFS), the common internet file system (CIFS), etc.

An issue that may arise with network filesystems is the support for record locks. A record lock is a lock initiated by a client on a region of a file, which may comprise a portion of the file, the entire file, and sometimes a region of storage beyond the end of the file. The region (or "record") may be any contiguous set of bytes in the file (or beyond the end of the file, in some cases). Record locks may be of various types (e.g. a shared lock that permits other clients to read the file but prevents write access, or an exclusive lock that prevents read or write access by other clients). NFS record locks may be unmonitored or monitored locks. Unmonitored locks are not monitored for crashes/reboots of the server of the filesystem on which they were created nor for crashes/reboots of the client that created them. Monitored locks are monitored for such crashes/reboots. Monitored locks may be recovered (that is, reestablished prior to granting new locks) when crashes/reboots are detected. Record locks may generally be used to synchronize the access of unrelated processes to a particular file (or record). Record locks may be more succinctly referred to herein as "locks". Additionally, a lock may be referred to as "on a filesystem" if the record locked by the lock is on a file stored in the filesystem.

NFS-based systems implement record locking using two additional protocols to the NFS protocol: NFS Lock Manager (NLM) protocol and Network Status Monitor protocol (NSM). The NLM protocol specifies a locking model, and the NSM protocol is used to notify clients and servers of the loss of lock state (e.g. due to a crash or reboot of a client or server). Thus, both NLM and NSM are used for monitored locks.

Generally, the server maintains the details of the locks granted by the server to various clients in volatile memory (for performance reasons). Accordingly, when a server crashes or reboots, the details of the locks are lost (e.g. the record that is locked, the type of lock, the client holding the lock, etc.). However, the server also maintains a list, in nonvolatile memory, of which clients have locks in any of the filesystems served by that server. If the server crashes or reboots, the client list is read after the server is brought back up and the clients are notified of the server crash/reboot. The clients are given a period of time (a "grace period") to reestablish (reclaim) their previously existing locks before new locks may be granted.

In highly available (HA) environments, a cluster of computer systems (nodes) are used to provide the HA services. If one of the nodes crashes, the node or a service executing on the node experiences some other sort of failure, or even just to balance load among the nodes, services may be "failed over" to another node. That is, the service may be stopped on the original node (which stoppage may already have occurred if the original node has crashed) and is started on another node with the service's state at or near the state existing on the original node at the time of the failure.

If the network filesystem is to be HA, each exported filesystem needs to be part of an HA service that should be able to be failed over from one node to another. Thus, the record locks for the failing-over filesystem need to be recovered on the node that the filesystem fails over to. However, recovery is typically initiated by the network filesystem software when it is restarted as part of booting the crashed/rebooted server. For example, in NFS, two software daemons (lockd and statd) are implemented as part of the NLM and NSM protocols. The lockd and statd daemons register and provide remote procedure call (RPC) locking services. The lockd daemon is part of the NLM implementation, while the statd daemon is part of the NSM implementation. When these daemons are restarted, recovery of the locks on the server is initiated using the list of clients in that server's non-volatile memory. When a filesystem is failed over to a "failed to" node, the lockd and statd daemons are already operating on the "failed to" node. Additionally, the list of clients that had locks on the filesystem is on the server from which the filesystem is failing away. Furthermore, the "failed to" node may be serving other filesystems for which the lock recovery is not needed. Currently, when NFS is operating in an HA environment, the statd and lockd daemons are restarted on all nodes when any filesystem fails over. Thus, all locks are reclaimed (even those that were not lost in the fail over). Furthermore, the lock services on the "failed to" node and the node from which the filesystem is failing are interrupted for other filesystems being served on those nodes.

SUMMARY OF THE INVENTION

In one embodiment, a computer accessible medium may be encoded with a plurality of instructions which may be executed in a first node of a plurality of nodes during use. The plurality of instructions may be executed in response to a fail over of a first service group of a plurality of service groups from a second node of the plurality of nodes. Each of the plurality of service groups may include one or more filesystems. The plurality of instructions, when executed, initiate lock recovery for locks on at least one filesystem in the first service group. Locks on one or more filesystems in a second service group of the plurality of service groups are maintained during a time period that locks in the first service group are recovered. For example, locks in a second service group for which the first node is now acting as a server may be maintained, or locks in a second service group for which a different node is acting as the server may be maintained.

In another embodiment, a cluster comprises a plurality of filesystems and a plurality of nodes. Each of the plurality of filesystems are included in one of a plurality of service groups, and each of the plurality of service groups include one or more filesystems of the plurality of filesystems. The plurality of nodes may be configured to: (i) act as a server of the plurality of service groups; (ii) provide record locking in the plurality of filesystems; and (iii) maintain a plurality of client lists. Each of the plurality of client lists is included in a respective service group of the plurality of service groups and identifies clients having at least one lock on at least one filesystem in the respective service group. In some embodiments, a method includes maintaining a plurality of client lists, wherein each of the plurality of client lists is included in a respective service group of a plurality of service groups and identifies clients having at least one lock on at least one filesystem in the respective service group. The method may further include failing over a first service group of a plurality of service groups from a first node of a plurality of nodes to a second node of the plurality of nodes, and the second node initiating lock recovery for locks on filesystems in the first service group responsive to the fail over using a first client list of the plurality of client lists, wherein the first list is included in the first service group.

In some implementations, a computer accessible medium may be encoded with a plurality of instructions which, when executed in a first node of a plurality of nodes in response to a fail over of a first service group of a plurality of service groups from a second node of the plurality of nodes, initiate lock recovery for locks in one or more filesystems included in the first service group. The lock recovery may be initiated using a first client list of a plurality of client lists, wherein each of the plurality of client lists is included in a respective service group of the plurality of service groups and identifies clients having at least one lock on at least one filesystem of the respective service group. The first client list is included in the first service group.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
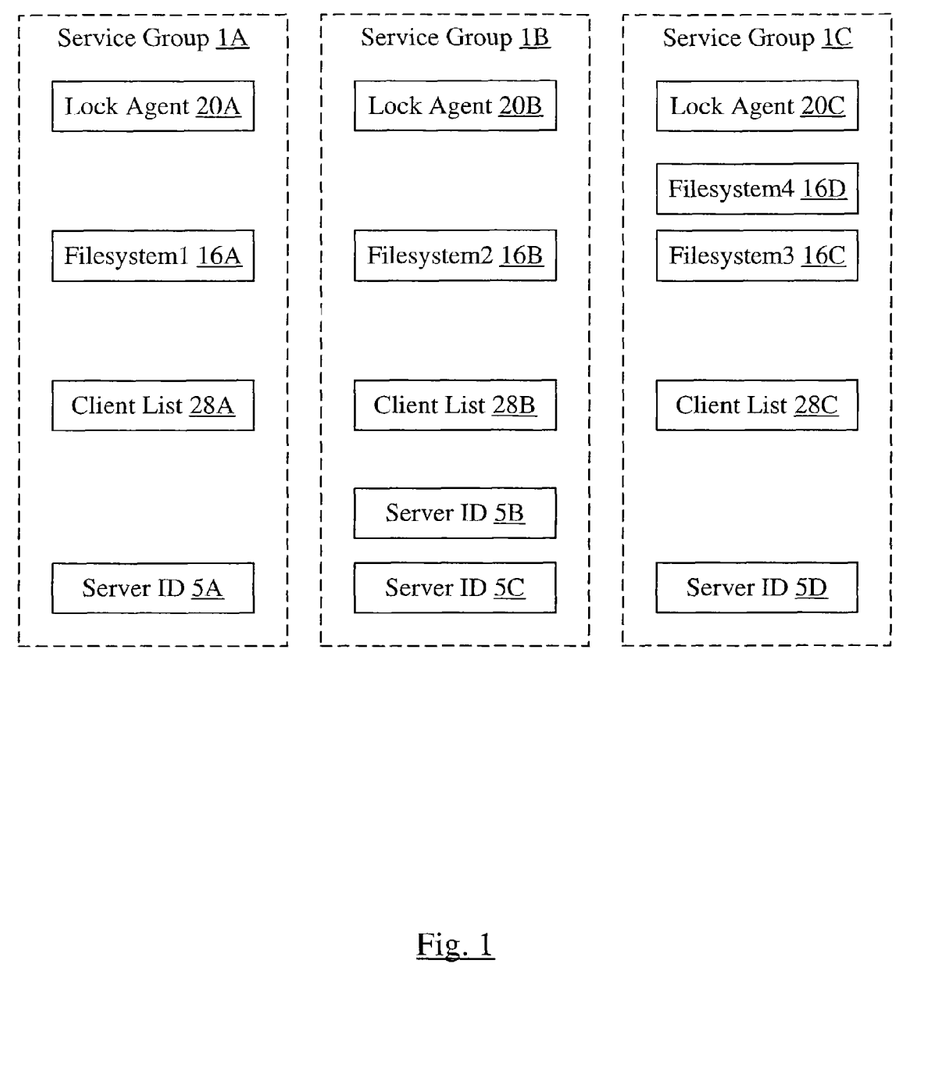
FIG. 1 is a block diagram illustrating a logical view of one embodiment of a cluster of nodes that provide network file system service for a set of filesystems and a set of clients.

Turning now to FIG. 1, a block diagram illustrating a logical view of one embodiment of a cluster of nodes that provide filesystem service for a plurality of filesystems 16A-16D is shown. Each of the filesystems 16A-16D may be included in a service group (e.g. service groups 1A-1C in FIG. 1). Generally, a "service group" may comprise at least one filesystem and one or more resources that correspond to the filesystem(s). The resources comprise at least one server identifier (e.g. the server IDs 5A-5D in FIG. 1), and may optionally include other software and/or hardware resources (e.g. the client lists 28A-28C, lock agents 20A-20C, etc.). The service group is failed over from node to node in the cluster as desired. In some embodiments, more than one filesystem 16A-16D may be included in a service group (e.g. the service group 1C includes filesystems 16C-16D in the illustrated embodiment).

In the illustrated embodiment, the service groups 1A-1C may include at least one server identifier (e.g. server IDs 5A-5D shown in FIG. 1). The server identifier may identify a server used by clients of a filesystem to access the filesystem. That is, the clients identify a server on the network to which the clients are coupled using the server ID. Generally, a server identifier may comprise any value or values which uniquely identifies the server on a network. For example, in one embodiment, the server ID may be an internet protocol (IP) address (or the server's name, which may be linked to the server's IP address using a domain name service (DNS)). More than one server ID may be used (e.g. if various clients use different server IDs to access a given filesystem, or if more than one filesystem is included in the service group and different server IDs are used for different filesystems). For example, the service group 1B includes two server IDs 5B-5C for the filesystem 16B.

In the illustrated embodiment, each service group 1A-1C may include a client list (e.g. the client lists 28A-28C shown in FIG. 1). The client list may be a list of clients that hold one or more locks in a filesystem within the service group. That is, the clients holding locks may be maintained on a per-service group basis. Thus, clients holding locks in a failing-over service group 1A-1C may be accurately identified. In response to the fail over of a given service group 1A-1C, the clients in the client list of that service group may be informed that they should reclaim their locks (e.g. using the server ID(s) in the service group). The clients may reclaim their locks in the filesystems within the failing over service group, without impacting the locking services in the other service groups. Viewed in another way, locking services may not be interrupted in the other service groups (e.g. locks in the other service groups may be maintained while locks in the failing-over service group are reclaimed, locks may be granted in the other service groups, etc.). Clients holding locks on filesystems in non-failing-over service groups may not be required to reclaim locks on those filesystems.

In one implementation, each service group 1A-1C may include an instance of a lock agent (e.g. lock agents 20A-20C). The lock agent may be responsible for monitoring the lock service in the service group, and may interact with the lock service (e.g. the lockd and statd daemons) to recover locks during a fail over of the service group 1A-1C. Additional details regarding the lock agents are provided further below.

Figure 2:
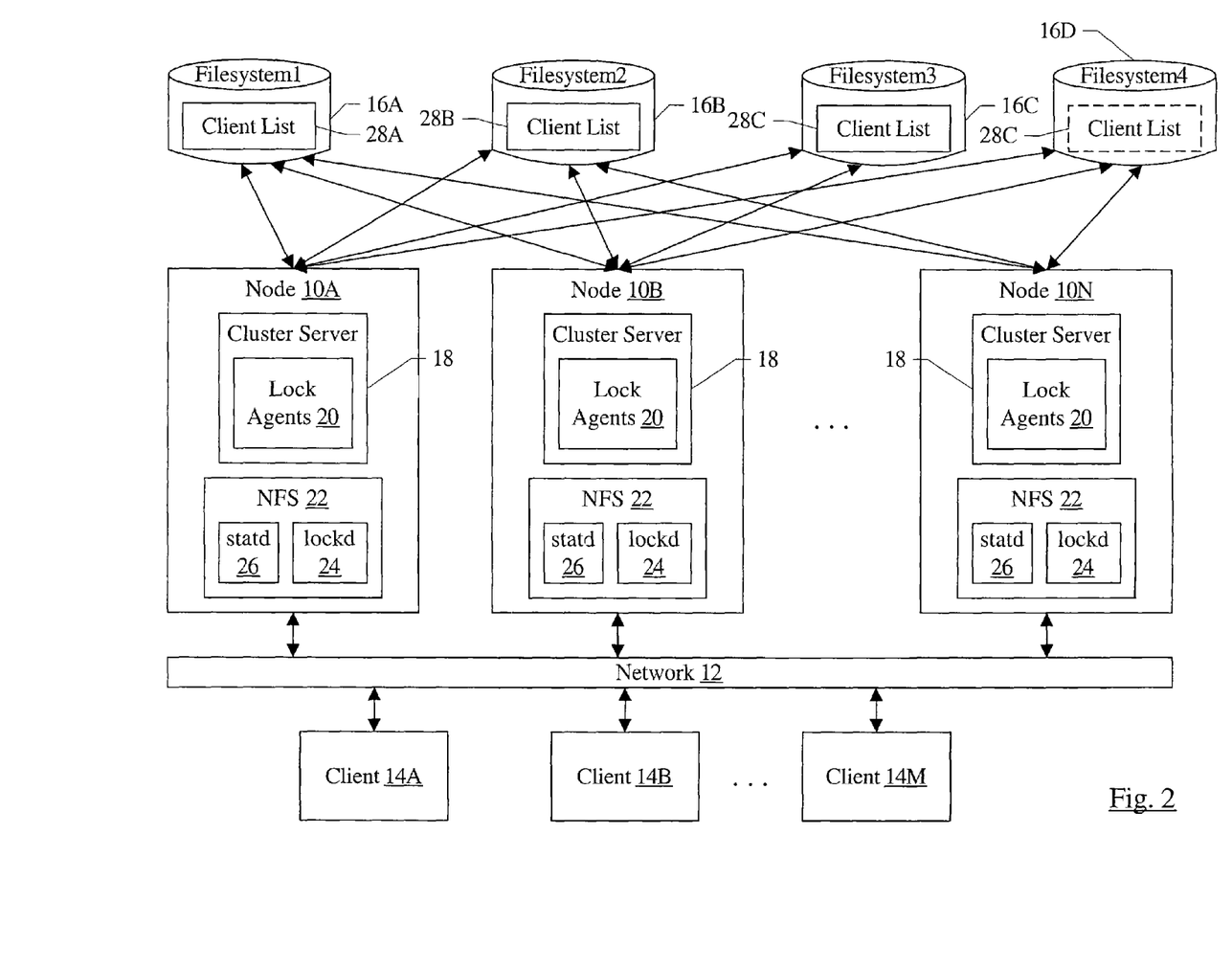
FIG. 2 is a block diagram illustrating a physical view of one embodiment of the cluster of nodes.

Turning now to FIG. 2, a block diagram is shown illustrating a physical view of one embodiment of a cluster of computer systems for providing HA access to one or more network filesystems 16A-16D. Each computer system is referred to as a "node" in the cluster (e.g. nodes 10A-10N in FIG. 2). In the embodiment of FIG. 2, the nodes 10A-10N are coupled to a network 12 to which a plurality of clients 14A-14M are coupled. Additionally, the nodes 10A-10N are coupled to the filesystems 16A-16D. Each of the nodes 10A-10N may include cluster server software 18, which may include a lock agent 20. More particularly, instances of the lock agent 20 may be executing on each node 10A-10N for each service group 1A-1C (that is, in the embodiment of FIG. 1, instances 20A-20C may be executing on each node 10A-10N). Additionally, each of the nodes 10A-10N may include software implementing NFS (e.g. reference numeral 22), which may include the lockd daemon 24 and the statd daemon 26 for implementing record locking in NFS.

In the description below, NFS will be used as an example of a network filesystem that permits record locking. However, any network filesystem which permits record locking may be used in other embodiments. Additionally, while the statd and lockd daemons are referred to in the present description, other embodiments may implement locking without using the statd and lockd daemons. For example, in NFS version 4, currently in development, it is contemplated that record locking will become part of the NFS protocol (rather than providing record locking using NLM and NSM). Embodiments are contemplated in which the interaction with the lockd and statd daemons described below are instead interactions with the network filesystem software (e.g. NFS 22 in the illustrated embodiment), if the network filesystem protocol directly supports locking.

The nodes 10A-10N may collectively act as servers for the filesystems 16A-16D. At any given point in time, one of the nodes 10A-10N may be acting as the server for the filesystems 16A-16D within a given service group 1A-1C. A given node 10A-10N may be acting as the server for the filesystems 16A-16D in more than one service group 1A-1C at a given point in time. A node 10A-10N may experience a failure serving the filesystems 16A-16D within a service group 1A-1C, and that service group 1A-1C may be failed over to another node 10A-10N. Alternatively, a service group 1A-1C may be failed over for other reasons (e.g. load balancing). When a service group 1A-1C is failed over in the cluster, lock recovery for locks in each filesystem 16A-16D included in the failing-over service group 1A-1C may be initiated by the node to which the service group 1A-1C is failed (the "failed-to node"). Locks held on other filesystems (within other service groups 1A-1C that are not failing over) may be unaffected (that is, the existing locks may be maintained). Locks may be maintained on the filesystems that are included in other service groups 1A-1C on the failed-to node (e.g. on the filesystems for which the failed-to node is acting as the server), as well as on filesystems that are included in other service groups 1A-1C on other nodes (e.g. on the filesystems for which other nodes than the failed-to node are acting as the server). In other words, the failed-to node may not initiate lock recovery for filesystems other than the filesystems in the failing-over service group.

In one embodiment, the nodes 10A-10N may maintain a separate client list for each service group 1A-1C (illustrated in FIGS. 1 and 2 as client lists 28A-28C). The client list corresponding to service group 1A-1C may identify the clients 14A-14M that have a lock in at least one filesystem within the service group 1A-1C. By maintaining a separate client list 28A-28C per service group 1A-1C, the clients 14A-14N that hold locks in a filesystem 16A-16D within the failing over service group 1A-1C may be accurately identified for initiating lock recovery. Thus, when a service group 1A-1C is failed over in the cluster, lock recovery may be initiated by the failed-to node using the client list corresponding to that service group and the server IDs corresponding to that service group. The failed-to node may read the client list corresponding to the failing-over service group, and may notify the clients in the client list that they should reclaim their locks using the notification specified by NSM. That is, the notification may indicate that the server of the filesystem in the service group 1A-1C have just "come up", and that locks in the filesystem are to be reclaimed. A notification may be transmitted to each client for each server ID 5A-5D in the service group 1A-1C. Additionally, the failed-to node may start a grace period for the filesystems 16A-16C in the failing-over service group 1A-1C, to permit locks to be reclaimed without granting new locks in the filesystems within the failing over service group. The node from which a filesystem is failing away may be referred to herein as the "failed-from node". Thus, the fail over of a filesystem may include the failed-to node beginning to act as the server for the filesystem(s) in the failing-over service group and the failed-from node (if it is still in operation) ceasing to act as the server for the filesystem(s) in the failing-over service group.

In one embodiment, each of the client lists 28A-28C may be stored in at least one of the filesystems 16A-16D included in the corresponding service group 1A-1C to which that client list 28A-28C corresponds. Thus, for the service groups 1A-1C shown in FIG. 1, the client list 28A is stored in the filesystem 16A; the client list 28B is stored in the filesystem 16B; and the client list 28C is stored in the filesystem 16C. If a given service group 1A-1C includes more than one filesystem 16A-16D, the client list 28A-28C corresponding to that service group 1A-1C may optionally be stored on more than one of the filesystems for redundancy (e.g. the client list 28C may optionally be stored on the filesystem 16D as well, shown in FIG. 2 in dashed form). Since the nodes 10A-10N have access to each filesystem 16A-16D in order to act as the server for the filesystem, a failed-to node may have access to the client lists 28A-28C stored on those filesystem 16A-16D. Alternatively, the client lists 28A-28C may be stored on any storage to which each of the nodes 10A-10N have access. Such storage may be included as a resource in the service group 1A-1C to which the client list 28A-28C corresponds. As used herein, the term "filesystem" may include a collection of files and a corresponding organizational structure, such as a directory tree or other metadata describing the organizational structure. A filesystem may include files stored on one or more physical storage devices.

In the illustrated embodiment, the cluster server software 18 in each node 10A-10N is used to manage the cluster and to fail over service groups. The cluster server software 18 on each node 10A-10N communicates with the cluster server software 18 on the other nodes 10A-10N to manage the cluster, to select nodes to act as the server for the filesystems 16A-16D within a given service group 1A-1C, to monitor operation of the nodes to detect failures, and to fail over a service group when a failure is detected. In one implementation, the cluster server may operate similar to the VERITAS Cluster Server™ product available from VERITAS Software Corporation (Mountain View, Calif.).

The cluster server software may monitor the various resources for a given service group, and may fail over a service group if one of the resources are detected as failing. Resources may include software (e.g. applications, operating system software components, operating system services, etc.) and/or hardware (e.g. disk drives, network interface circuitry, etc.). For example, in one embodiment, the resources in a service group for a filesystem may include one or more server IDs (e.g. one or more internet protocol (IP) addresses that enable the filesystem to be accessed on the network 12), one or more network interface controllers (NIC) on each node 10A-10N that may act as the server(s) of the filesystem(s) in the service group, a share service that "shares" or "exports" the filesystem(s) for client access, NFS, the lock services (e.g. including the lockd and statd daemons in this embodiment), the mount service for mounting the filesystem, the volume manager service for managing the volume or volumes in the filesystem, and the one or more disks on which the filesystem is stored. If any of the resources fails on the node currently serving the filesystem, the filesystem may be failed over to another node. It is noted that each service group may comprises resources that may be moved from node to node without affecting the operation of other service groups that may be online in the nodes. That is, each service group may be independent of other service groups.

The cluster server software 18 may include various agents used to monitor the resources in the service group(s) (and, in some cases, modify the operation of the resource, start the resource, stop the resource, etc.). For example, the lock agents may monitor the lock service, and may interact with the lock service to provide lock recovery on fail over. Thus, in the illustrated embodiment, the lock agent 20 may interact with the lockd and statd daemons in NFS. As mentioned above, an instance of the lock agent 20 may be executing on each node 10A-10N for each service group 1A-LC (e.g. the lock agent 20A instance for the service group 1A may be executing on each node 10A-10N, the lock agent 20B instance for the service group 1B may be executing on each node 10A-10N, etc.).

As mentioned above, the nodes 10A-10N are coupled to the filesystems 16A-16D to provide filesystem service. The nodes 10A-10N may be coupled to the filesystems 16A-16D in any desired fashion. For example, the nodes 10A-10N may be coupled to the filesystems 16A-16D via the network 12, in some embodiments. In other embodiments, a separate network from then network 12 may be used, or other connections may be used (e.g. peripheral connections such a peripheral component interconnect (PCI), Fibre Channel, small computer systems interface (SCSI), etc. may be used). Additionally, while each of the nodes 10A-10N is shown as being coupled to each filesystem 16A-16D, other embodiments may have subsets of the nodes 10A-10N coupled to each filesystem 16A-16D (i.e. some nodes 10A-10N may not be coupled to a given filesystem 16A-16D). In such embodiments, fail over of a given filesystem may occur among the subset of nodes coupled to that filesystem.

The network 12 may comprise any network technology in various embodiments. The network 12 may be a local area network, wide area network, intranet network, Internet network, wireless network, or any other type of network or combinations of the above networks. The network 12 may be designed to be continuously available (although network outages may occur), or may be intermittent (e.g. a modem connection made between a computer system in a user's home and a computer system in a user's workplace). Any network media may be used. For example, the network 12 may be an Ethernet network. Alternatively, the network may be a token ring network, etc. Additionally, the network 12 may comprise shared storage or shared memory for communicating between the computer systems, in some embodiments.

The clients 14A-14M may each comprise computer systems that import one or more of the filesystems 16A-16D during use. As used herein, a "client" may comprise a computer system that imports at least one network filesystem. The clients 14A-14M may make filesystem requests (e.g. read or write files, create or delete files, create or delete directories, etc.) for the imported filesystem over the network 12, and the node 10A-10N that is serving the filesystem may respond to the requests. Additionally, the clients 14A-14M may request locks on the filesystems, and the nodes 10A-10N may respond to the lock requests. The clients 14A-14M may also recover locks in a filesystem or filesystems as described above.

It is noted that, in some embodiments, the nodes 10A-10N may also provide for fail over of other services besides the filesystems 16A-16D (e.g. various applications, not shown in FIG. 2). Any service for which high availability is desired may be provided by the cluster of nodes 10A-10N. It is noted that, in various embodiments, any number of filesystems 16A-16D, nodes 10A-10N, and clients 14A-14M may be included.

Figure 3:
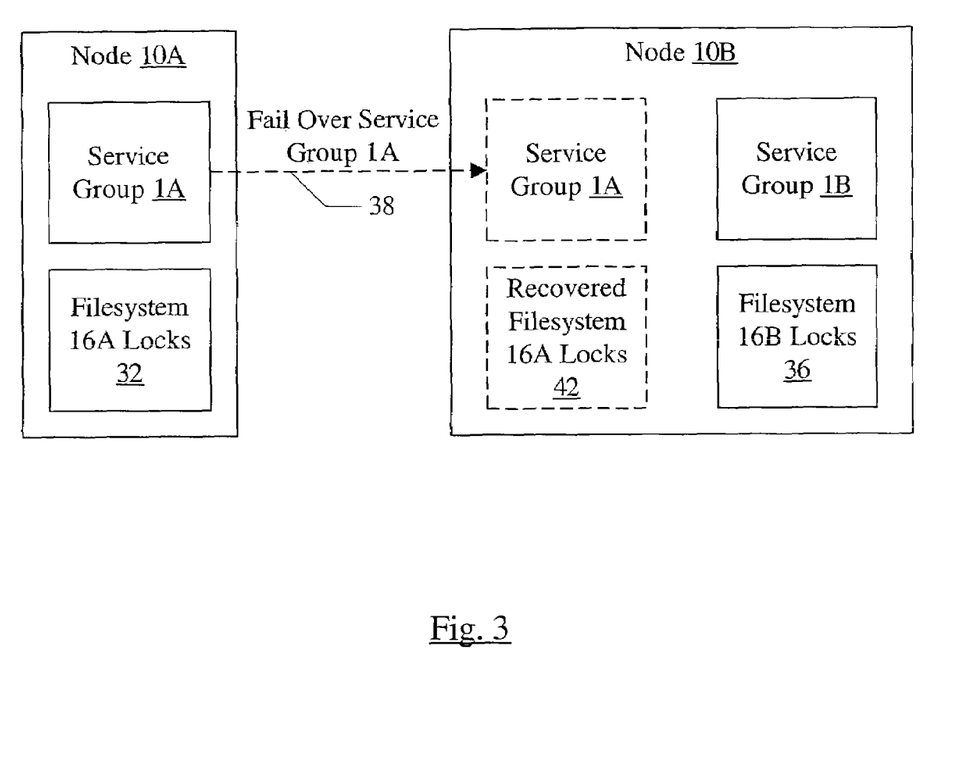
FIG. 3 is a block diagram illustrating one embodiment of fail over of a service group from one node to another.

FIG. 3 is a block diagram illustrating an example of a fail over of the service group 1A from node 10A to node 10B, which is also providing the service group 1B (e.g. acting as the server of the filesystem 16B). Thus, initially the node 10A is providing the service group 1A and is maintaining, in its volatile memory, the set of locks granted on the filesystem 16A (block 32 in FIG. 3). That is, block 32 may identify each lock granted on the filesystem 16A (in the service group 1A), including the record that is locked, the type of lock, and the client holding the lock. Similarly, the node 10B is maintaining the set of locks granted on the filesystem 16B (block 36).

The service group 1A may be failed over from the node 10A to the node 10B (arrow 38). The fail over may occur for a variety of reasons. For example, the node 10A may experience a failure (e.g. a crash or a hang), the node 10A may transfer the service group 1A for load balancing in the cluster, etc. In response to the fail over, the node 10B establishes the service group 1A (dashed block in FIG. 2). Additionally, the node 10B recovers the existing locks for the filesystem 16A (represented by block 32 in the node 10A) by causing the clients 14A-14M indicated in the client list for the service group 1A to reclaim their locks. In this manner, the locks granted on the filesystem 16A by the node 10A may be recovered in the node 10B (block 42). Additionally, the locks for the filesystem 16B on the node 10B may be unaffected by the recovery of the locks for the filesystem 16A (e.g. the clients 14A-14M holding locks on the filesystem 16B may not be asked to recover their locks on the filesystem 16B).

Figure 4:
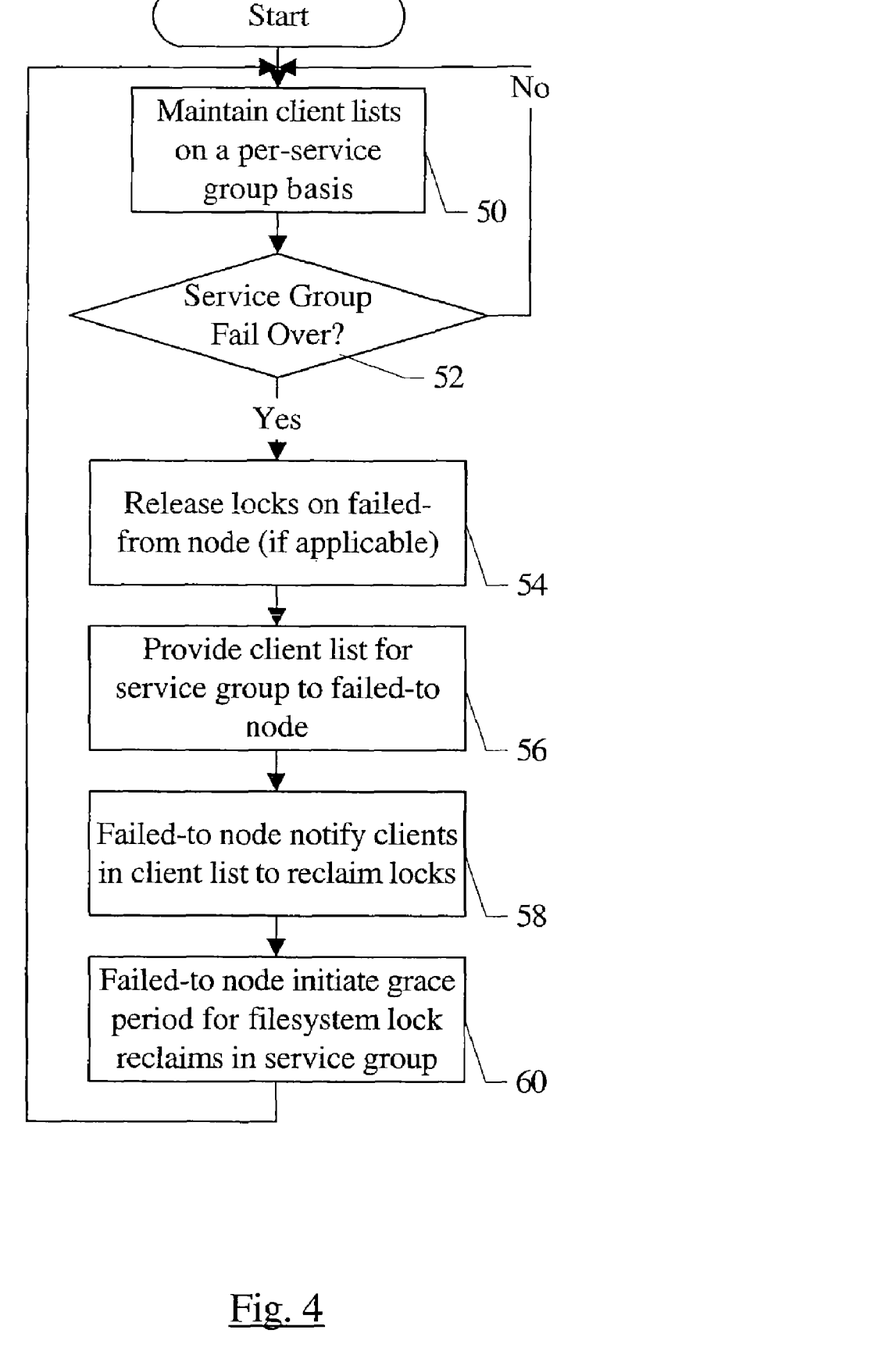
FIG. 4 is a flowchart illustrating one embodiment of a method for handling locks.

FIG. 4 is a flowchart illustrating one embodiment of a method for failing over a service group having one or more filesystems in which clients may hold one or more locks. The method may be implemented by the nodes 10A-10N. For example, the nodes 10A-10N may include instructions which, when executed on the nodes 10A-10N, implement the functionality illustrated in FIG. 4. Some of the instructions may be implemented within the software that implements NSM and NLM, and some may be implemented in the lock agent, in various embodiments.

The nodes 10A-10N maintain the client lists 28A-28C for the service groups 1A-1C on a per-service group basis (that is, a separate client list 28A-28C is maintained for each respective service group 1A-1C) (block 50). As locks are granted to clients on a filesystem in a given service group 1A-1C, the client is added to the client list that corresponds to the given service group (if the client is not already in the client list). If a service group fail over is not occurring (decision block 52, "no" leg), the nodes 10A-10N continue to maintain the client lists 28A-28C as indicated by block 50.

If a service group fail over is occurring (decision block 52, "yes" leg), the locks for the filesystem(s) in the service group are released on the failed-from node (block 54). Block 54 may be optional, and may not occur if the failed-from node has crashed, for example. Additionally, the client list for the failing-over service group is provided to the failed-to node (block 56). For example, if the client list is maintained in a filesystem of the failing-over service group (as illustrated in FIG. 2), the path name to the client list in the filesystem may be provided to the failed-to node. The client list may be represented in any desired fashion. For example, the client list may comprise a file in which the client names are listed (and/or the client IP addresses). Alternatively, the client list may comprise a directory in which files are created, where the file name is the name of a client in the client list. In one specific embodiment, the client list may comprise a directory in which files are created, with the file name being the name of a client in the client list, and a symbolic link is also created to the file for any aliases of the client name.

The failed-to node notifies the clients in the client list of the failing-over service group that the clients are to reclaim their locks (block 58). For example, in the NFS filesystem using the NLM and NSM protocols, an SM_NOTIFY remote procedure call (RPC) may be made to each client, indicating the server ID or IDs in the service group. Additionally, the failed-to node initiates a grace period for the failing-over service group for the clients to recover their locks in the filesystem(s) in the failing-over service group (block 60). The grace period applies to the server IDs (and filesystems) in the failing-over service group but not to other server IDs/filesystems (in other service groups) for which the failed-to node may be acting as the server (e.g., in the example of FIG. 3, the grace period on the node 10B applies to the filesystem 16A but not to the filesystem 16B). The grace period may be a period of time in which lock reclaim requests are processed from clients, and new lock requests are rejected. The nodes 10A-10N continue to maintain the client lists on a per-filesystem basis (block 50).

Turning next to FIGS. 5-9, additional details of one embodiment of a lock agent, lockd daemon, and statd daemon for implementing one embodiment of the method illustrated in FIG. 4 are described. As mentioned above, other embodiments may implement record locking directly, and thus the description of interacting with the lockd daemon and statd daemon may apply to interacting with the filesystem software, in some embodiments. For this embodiments, the lockd daemon 24 and the statd daemon 26 executing on each node 10A-10N may remain active on that node as various fail overs of service groups occur (that is, the daemons 24 and 26 may generally not be restarted as part of the fail over). A failing-over service group may unregister with the daemons 24 and 26 on the failed-from node and may register with the daemons 24 and 26 on the failed-to node.

The lock agent 20 may include portions that are executed when the service group is being brought "online" (e.g. being activated on a failed-to node) and when the service group is being taken "offline" (e.g. being deactivated on a failed-from node that has not crashed). Thus, the online portion of the lock agent 20 (more particularly the instance of the lock agent 20 for the failing-service group on the failed-to node) may be part of implementing blocks 56-60 in FIG. 4, and the offline portion of the lock agent 20 (more particularly the instance of the lock agent 20 for the failing-over service group on the failed-from node) may be part of implementing block 54 in FIG. 4, for one embodiment. The lock agent 20 may further include a portion that is executed during monitoring (e.g. on a node after the online has occurred and prior to an offline). The online portion of one embodiment of the lock agent 20 is illustrated in FIG. 5, and the offline portion of one embodiment of the lock agent 20 is illustrated in FIG. 6.

Figure 5:
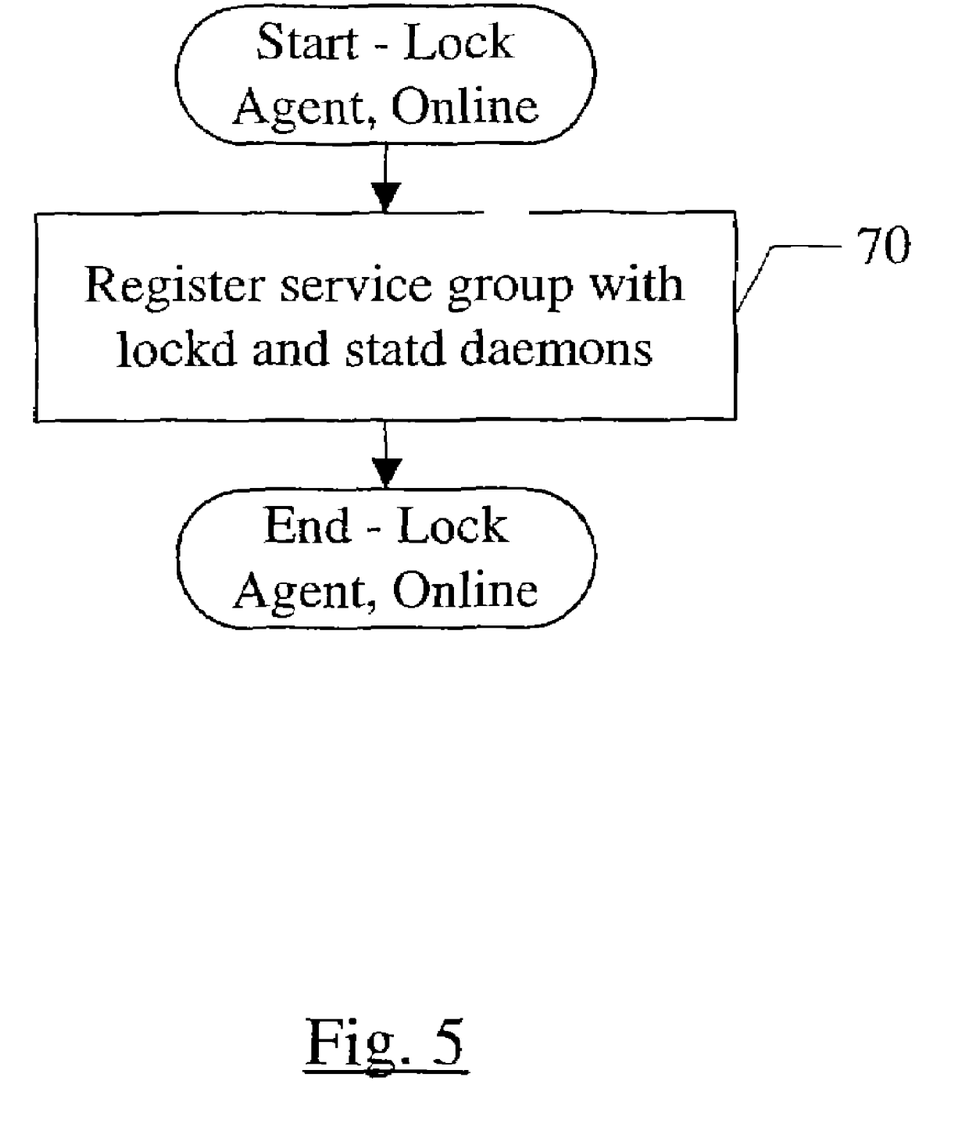
FIG. 5 is a flowchart illustrating operation of one embodiment of a lock agent shown in FIGS. 1 and 2 during an online event.

Turning now to FIG. 5, a flowchart illustrating a portion of one embodiment of the online portion of the lock agent 20 is shown. The lock agent instance 20A-20C corresponding to the failing-over service group 1A-1C on the failed-to node 10A-10N may execute the online portion as part of activating the service group on the failed-to node. The lock agent 20 may each include instructions which, when executed, perform the operation illustrated in the flowchart of FIG. 5.

The lock agent may register the service group with the lockd daemon 24 and the statd daemon 26 on the failed-to node (block 70). Generally, registering the service group may include informing the lock daemon 24 and the statd daemon 26 of each server ID in the service group along with the location of the client list for the service group. Thus, if multiple server IDs are included in a failing-over service group, block 70 may represent multiple register requests (each including a different server ID from the service group and the location of the client list). If redundant copies of the client list are stored (e.g. in service groups having more than one filesystem), the server IDs may be registered with the set of locations of the client lists. In some embodiments, if desired, the lockd daemon 26 may also be provided with the list of server IDs and the list of filesystems in the service group, and the lockd daemon may prevent locks from being acquired through any other server ID.

Figure 6:
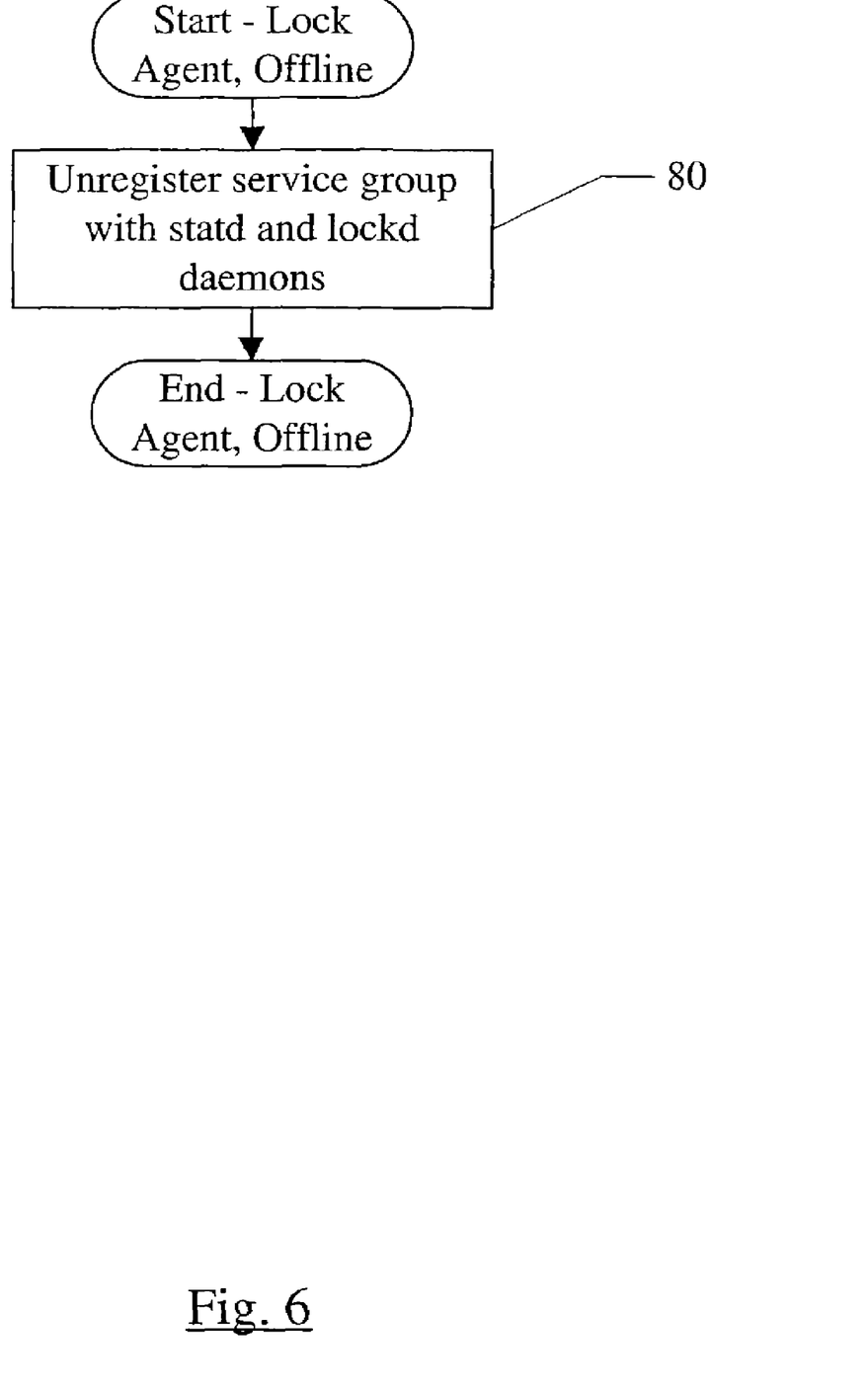
FIG. 6 is a flowchart illustrating operation of one embodiment of a lock agent shown in FIGS. 1 and 2 during an offline event.

Turning now to FIG. 6, a flowchart illustrating one embodiment of the offline portion of the lock agent 20 is shown. The lock agent instance 20A-20C corresponding to the failing-over service group 1A-1C on the failed-from node 10A-10N may execute the offline portion as part of deactivating the service group on the failed-from node. The lock agent 20 may include instructions which, when executed, perform the operation illustrated in the flowchart of FIG. 6.

The lock agent may unregister the service group with the lockd daemon 24 and the statd daemon 26 on the failed-from node (block 80). Generally, unregistering the service group may include informing the lock daemon 24 and the statd daemon 26 of each server ID in the service group and requesting that the server ID be unregistered. Thus, if multiple server IDs are included in a failing-over service group, block 80 may represent multiple unregister requests (each including a different server ID from the service group).

Figure 7:
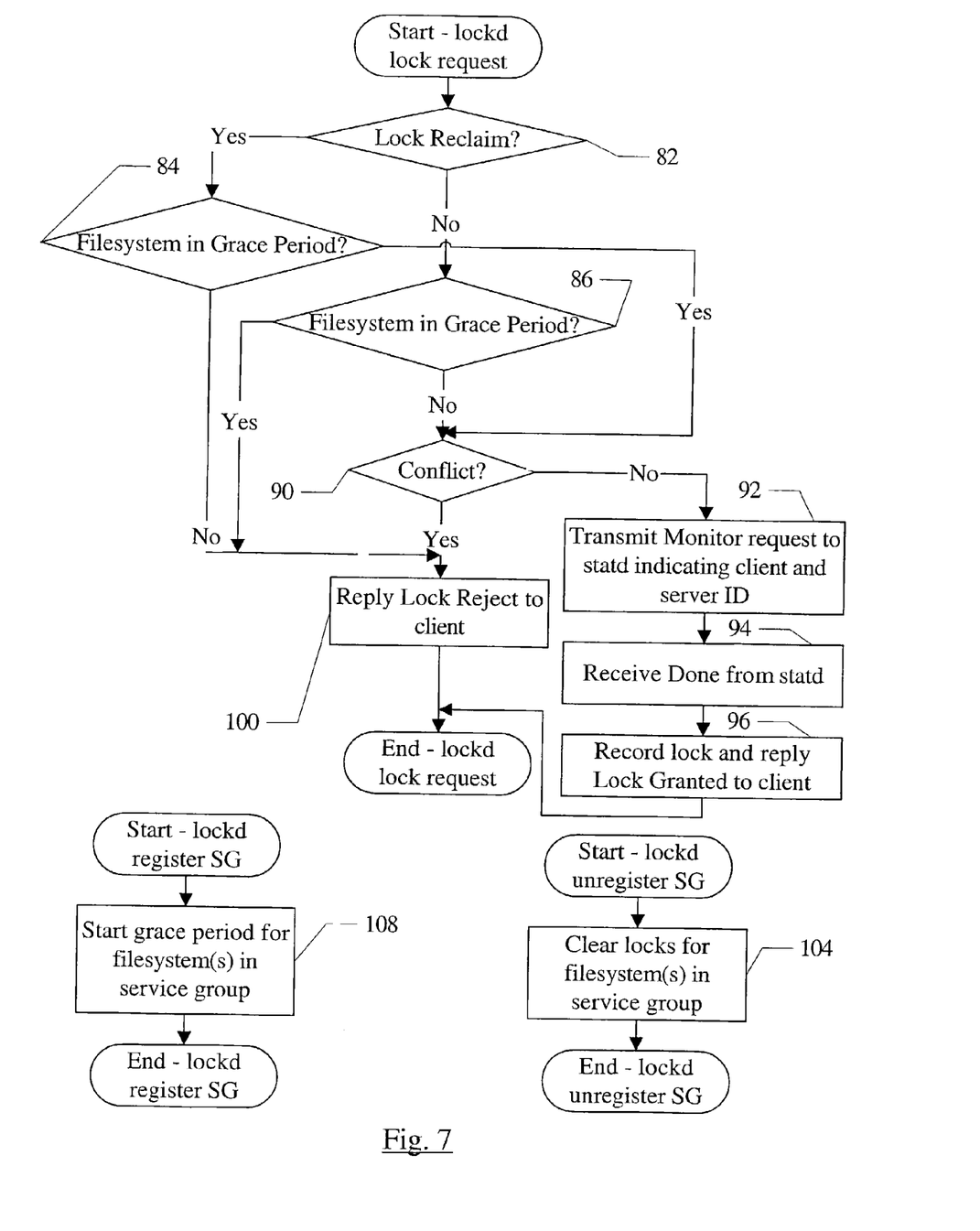
FIG. 7 is a set of flowcharts illustrating operation of one embodiment of a lockd daemon shown in FIG. 2 in response to various events.

Turning now to FIG. 7, a set of flowcharts illustrating operation of a portion of one embodiment of the lockd daemon 24 are shown. The flowcharts shown in FIG. 7 illustrate operation in response to receiving a lock request from a client, in response to a register request from the lock agent instance corresponding to a failing-over service group on the failed-to node, and an unregister request from the lock agent instance corresponding to a failing over service group on the failed-from node. The lockd daemon 24 may include instructions which, when executed, perform the operation illustrated in the flowchart of FIG. 7 on the node on which that lockd daemon 24 is executing.

In response to receiving a lock request, the lockd daemon 24 may determine if the lock request is grantable or non-grantable. A lock request may be grantable if: (i) the lock request is for a filesystem for which a grace period is running, the lock request is a lock reclaim, and the lock request does not conflict with an existing lock for the same region; or (ii) the lock request is for a filesystem for which a grace period is not running, the lock request is not a lock reclaim, and the lock request does not conflict with an existing lock for the same region. For example, a request for an exclusive lock may conflict with any existing lock. A request for a shared lock may conflict with an existing exclusive lock.

In FIG. 7, determining whether or not a lock request is grantable is illustrated via decision blocks 82, 84, 86, and 90. That is, if the lock request is a lock reclaim (decision block 82, "yes" leg), the filesystem on which the lock is requested is in a grace period (decision block 84, "yes" leg), and there is no conflict for the lock request (decision block 90, "no" leg), the lock request may be grantable and blocks 92, 94, and 96 may performed. If the lock request is a lock reclaim (decision block 82, "yes" leg), the request may not be grantable if the filesystem on which the lock is requested is not in a grace period (decision block 84, "no" leg) or if there is a conflict for the lock request (decision block 90, "yes" leg). If the lock request is not a lock reclaim (decision block 82, "no" leg), the request may be grantable if or filesystem on which the lock is requested is not in a grace period (decision block 86, "no" leg) and there is no conflict for the lock request (decision block 90, "no" leg). On the other hand, a non-reclaim lock request may not be grantable if the or filesystem on which the lock is requested is in a grace period (decision block 86, "yes" leg) or if there is a conflict for the lock request (decision block 90, "yes" leg).

If the lockd daemon (on a node 10A-10N that is acting as the server for a filesystem) receives a grantable lock request from a client, the lockd daemon may make a Monitor request to the statd daemon 26 on the node (block 92). The Monitor request may include an identification of client (e.g. client IP address or name) and the server ID. For example, in one implementation using NFS and the NLM and NSM protocols for record locking, the Monitor request may be an SM_MON RPC that is expanded to include the server ID. The lockd daemon receives a "Done" from the statd daemon (block 94), records the lock and replies Lock Granted to the client (block 96). On the other hand, if the lockd daemon receives a non-grantable lock request, the lockd daemon may reply Lock Reject to the client (block 100). For example, in one implementation using NFS and the NLM and NSM protocols for record locking, the Done may be a return code from the SM_MON RPC indicating success, and the Lock Granted or Lock Reject may be return codes to a NLM_LOCK RPC from the client. Alternatively, the Lock Granted or Lock Reject may be separate RPCs that asynchronously provide the response to the lock request. A lock request may be the NLM_LOCK RPC, in such an embodiment, which may include a reclaim flag which differentiates lock reclaims from new lock requests.

If the lockd daemon 24 receives a register request from the lock agent, the lockd daemon 24 starts a grace period for the filesystem(s) in the identified service group (block 108). The lockd daemon may have separate grace periods for each service group on the node, such that one service group having filesystem(s) in a grace period does not affect lock operation for the filesystems in other service groups on the same node (if any). If the lockd daemon 24 receives an unregister request from the lock agent, the lockd daemon 24 clears the locks recorded for the filesystems in the service group (block 104). For example of FIG. 3, the lockd daemon 24 on the node 10A may clear the locks represented by block 32 in response to the unregister request.

Figure 8:
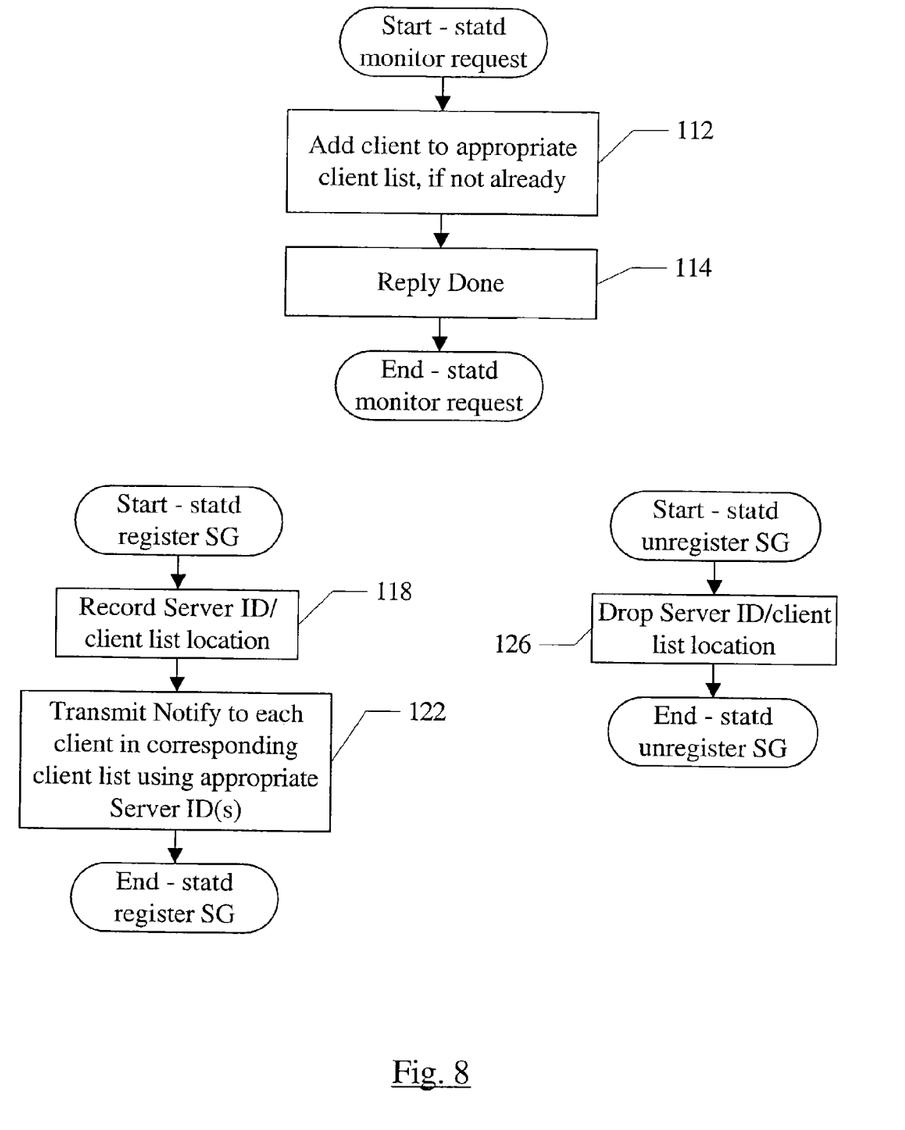
FIG. 8 is a set of flowcharts illustrating operation of one embodiment of a statd daemon shown in FIG. 2 in response to various events.

Turning next to FIG. 8, a set of flowcharts illustrating operation of a portion of one embodiment of the statd daemon 26 are shown. The flowcharts shown in FIG. 8 illustrate operation in response to receiving a monitor request from the lockd daemon 24 on the same node, in response to a register request from the lock agent instance corresponding to a failing-over service group on the failed-to node, and an unregister request from the lock agent instance corresponding to a failing over service group on the failed-from node. The statd daemon 26 may include instructions which, when executed, perform the operation illustrated in the flowchart of FIG. 8 on the node on which that statd daemon 26 is executing.

If the statd daemon 26 receives a register request including a new server ID/client list location pair from the lock agent, the statd daemon 26 may record the server ID/client list location for use in identifying the client list location for subsequent lock requests for the filesystem (block 118). Additionally, the statd daemon 26 may transmit Notify messages to each client in the corresponding client list (block 122). The Notify messages may each include the server ID to indicate which filesystem on which the clients are to reclaim locks. As mentioned above, in some embodiments that implement NFS and the NLM and NSM protocols, the Notify messages may be SM_NOTIFY RPCs to each client.

If the statd daemon 26 receives a Monitor request from the lockd daemon 24, the statd daemon may add the client indicated in the Monitor request to the client list corresponding to the service group identified in the Monitor request (e.g. by a server ID that is included in the service group) (block 112). As mentioned previously, the lock agent may provide the statd daemon with the server ID(s) and corresponding location of the client list for each service group having a filesystem for which the node is acting as the server in the register requests. From these recorded server ID/client list location pairs, the statd daemon 26 may be able to determine the client list to which the client is to be added. The statd daemon 26 replies Done to the lockd daemon 24 (block 114).

If the statd 26 daemon receives an unregister request from the lock agent, the statd daemon 26 may drop the server ID/client list location pair from its recorded set of such pairs (block 126).

In one embodiment, communication between the lock agent and the lockd and statd daemons may be via named pipes created by the lockd and statd daemons, owned by root and accessible only to root. The lock agent may use the named pipes to direct the lockd and statd daemons.

Other embodiments may be implemented in other fashions than that shown in FIGS. 5-8. For example, a statd and lockd daemon instance may be started for each service group (with software to route filesystem lock requests to the appropriate daemon for that service group). In such an embodiment the lockd and statd daemons for a failing-over service group may be restarted as part of the fail over. The restart may cause the lockd daemon to start the grace period and the statd daemon to transmit Notify messages for each client in the client list for the service group.

While RPCs are used to communicate between clients and servers in the above example, other embodiments may communicate using other mechanisms. For example, messages may be passed using any protocol, such as the transmission control protocol (TCP), user datagram protocol (UDP), or protocols residing on top of TCP or UDP. In another example, shared memory or disk storage may be used to communicate.

Figure 9:
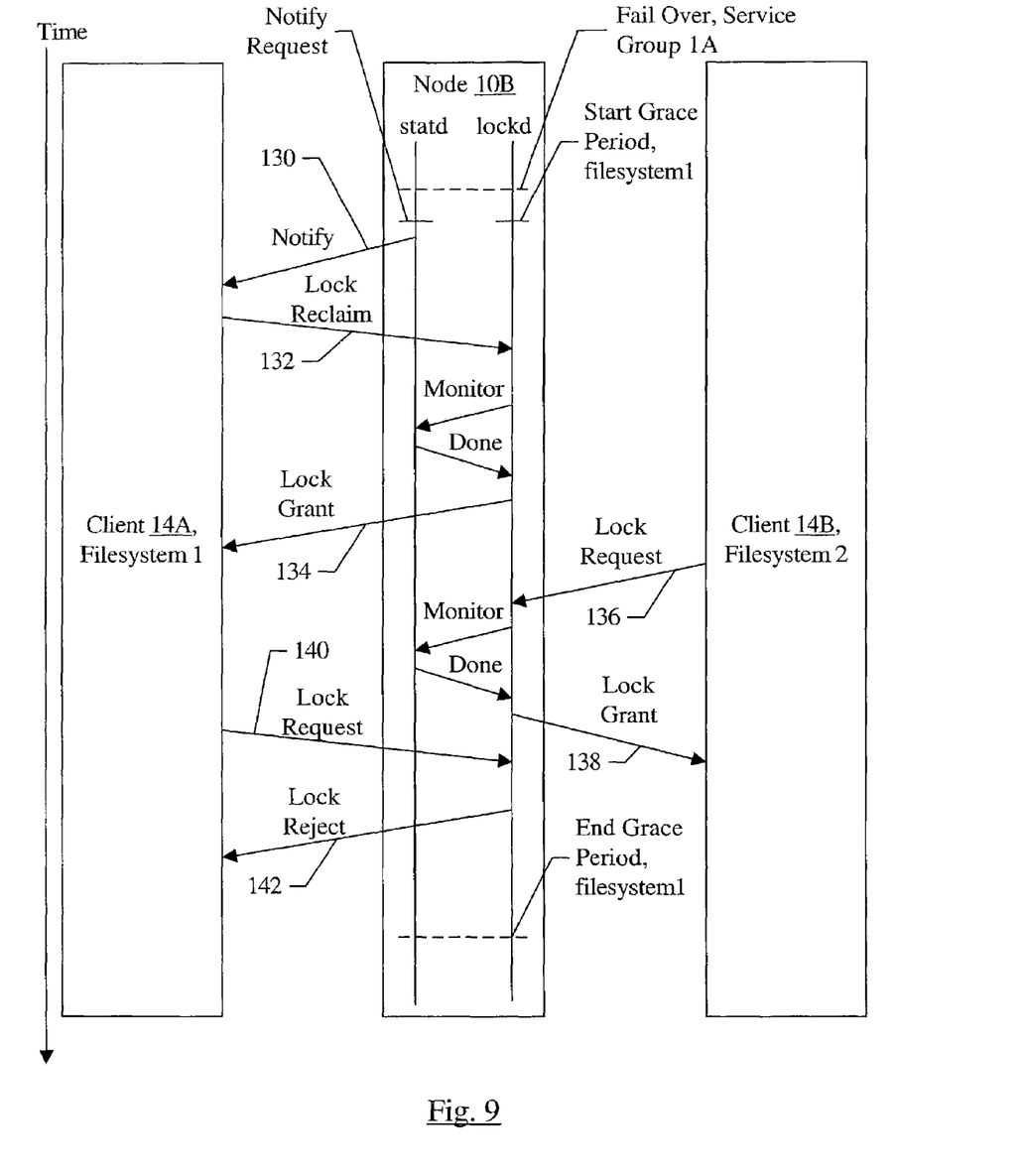
FIG. 9 is an example interaction of one embodiment of a node to which a service group is failed over, a client of a filesystem in that service group, and a client of another filesystem in another service group for which the node is providing service.

Turning next to FIG. 9, an example of interaction between the node 10B, a client 14A of the filesystem 16A (in the service group 1A), and a client 14B of the filesystem 16B (in the service group 1B) is shown for the fail over to node 10B of the service group 1A while the node 10B remains acting as the server of the filesystem 16B in the service group 1B. Also illustrated in FIG. 9 are the lockd and statd daemons 24 and 26 within the node 10B. Time is illustrated (in arbitrary units) increasing in a downward direction, as indicated by the arrow to the left of the client 14A.

The fail over of the service group 1A is indicated by the horizontal dashed line at the top of the statd and lockd lines in the node 10B. The lock agent registers the service group 1A with the statd daemon 26 (which transmits Notify messages) and the lockd daemon 24 (which starts the grace period for filesystem 16A), as indicated by the short horizontal lines labeled as such in FIG. 9. The end of the grace period for the filesystem 16A is indicated via the dashed line at the bottom of the statd and lockd lines in the node 10B. The statd daemon 26 in the node 10B transmits a Notify message to the client 14A (arrow 130) responsive to the client being in the client list for the service group 1A. The notify message includes the server ID from the service group 1A. In response to the Notify message, the client 14A transmits a Lock Reclaim request to the lockd daemon 24 (arrow 132). The lockd daemon 24 transmits the Monitor request to the statd daemon 26, which records the client 14A in the client list for the service group 1A (on the filesystem 16A) and transmits Done to the lockd daemon 24. The lockd daemon 24 records the lock and replies Lock Grant to the client 14A (arrow 134).

The client 14B transmits a lock request for the filesystem 16B during the grace period for filesystem 16A (arrow 136). Since the filesystem 16B (the service group 1B) is not in a grace period, the lockd daemon 24 proceeds to transmit the Monitor request to the statd daemon 26, which records the client 14B in the client list for the service group 1B and returns Done to the lockd daemon 24. The lockd daemon 24 records the lock and replies Lock Grant to the client 14B (arrow 138). On the other hand, if the client 14A transmits a lock request for the filesystem 16A during the grace period for filesystem 16A (arrow 140), the lockd daemon detects that the grace period is in place for the filesystem 16A and replies Lock Reject to the client 14A (arrow 142).

Figure 10:
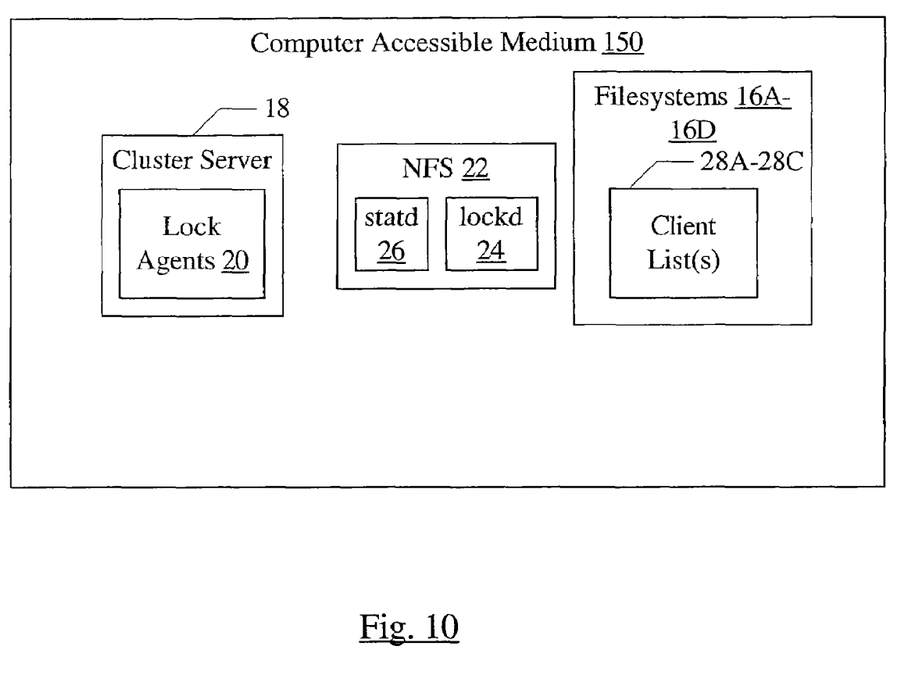
FIG. 10 is a block diagram of one embodiment of a computer accessible medium.

Turning now to FIG. 10, a block diagram of a computer accessible medium 150 is shown. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, volatile or non-volatile memory media such as RAM (e.g. SDRAM, RDRAM, SRAM, etc.), ROM, etc., as well as media accessible via transmission media or signals such: as electrical, electromagnetic, or digital signals, conveyed via a communication medium such as a network and/or a wireless link. The computer accessible medium 150 in FIG. 10 may be encoded with one or more of the cluster server 18 (including the lock agents 20), the NFS software 22 (including the lockd daemon 24 and the statd daemon 26), and/or the filesystems 16A-16D (including the client lists 28A-28C). Generally, the computer accessible medium 150 may store any set of instructions which, when executed, implement a portion or all of the flowcharts shown in one or more of FIGS. 4-8.

In some embodiments, the computer accessible medium 150 may comprise one or more of shared storage accessible to the nodes 10A-10N, storage included in the nodes 10A-10N, storage on removable media accessible to the nodes 10A-10N (at least temporarily), or any combination thereof.

Numerous variations and modifications will become apparent to those skilled in the art once the above disclosure is fully appreciated. It is intended that the following claims be interpreted to embrace all such variations and modifications.

What is claimed is:

1. A cluster comprising:
a plurality of filesystems, each of the plurality of filesystems included in one of a plurality of service groups, and each of the plurality of service groups including one or more filesystems of the plurality of filesystems; and
a plurality of nodes, each of the plurality of nodes comprising a computer system, wherein the plurality of nodes are configured to: (i) act as a server for the plurality of filesystems; (ii) provide record locking services in the plurality of filesystems; and (iii) maintain a plurality of client lists, each of the plurality of client lists included in a respective service group of the plurality of service groups and identifying clients having at least one lock on one of the one or more filesystems included in the respective service group, wherein a separate client list of the plurality of client lists is included in each respective service group of the plurality of service groups.

2. The cluster as recited in claim 1 wherein each of the plurality of client lists is stored in at least one of the one or more filesystems included in the respective service group.

3. The cluster as recited in claim 1 wherein, in response to detecting a failure with respect to a first service group on a first node of the plurality of nodes, a second node of the plurality of nodes is configured to begin acting as the server for the one or more filesystems in the first service group, and wherein the second node is configured to initiate lock recovery for locks in the one or more filesystems included in the first service group responsive to detecting the failure.

4. The cluster as recited in claim 3 wherein the second node is configured to read a first client list of the plurality of client lists, the first client list included in the first service group, to initiate lock recovery.

5. The cluster as recited in claim 3 wherein the second node is configured to initiate lock recovery by notifying each of the clients in the first client list that the clients should reclaim locks previously granted on a filesystem within the first service group.

6. The cluster as recited in claim 5 wherein the second node is configured to notify each of the clients by transmitting one or more server identifiers within the first service group to the clients.

7. The cluster as recited in claim 6 wherein each of the one or more server identifiers comprises an internet protocol address.

8. The cluster as recited in claim 5 wherein the second node is configured to initiate a period of time for the clients in the first client list to reclaim locks, wherein the second node is configured not to grant new locks on filesystems within the first service group during the period.

9. The cluster as recited in claim 8 wherein, if the second node is also acting as a server for one or more filesystems in a second service group of the plurality of service groups, the second node is configured to grant a lock requested by a client in a filesystem within the second service group during the period.

10. The cluster as recited in claim 3 wherein, if the second node is also acting as a server for one or more filesystems in a second service group of the plurality of service groups, the second node is configured to not initiate lock recovery for locks in the second service group responsive to the fail over of the first service group.

11. A method comprising:
maintaining a plurality of client lists, each of the plurality of client lists included in a respective service group of a plurality of service groups and identifying clients having at least one lock on at least one filesystem included in the respective service group, wherein a separate client list of the plurality of client lists is included in each respective service group of the plurality of service groups;
detecting a failure with respect to a first service group on a first node of the plurality of nodes;
responsive to detecting the failure, a second node of the plurality of nodes beginning to act as a server for the one or more filesystems in the first service group; and
the second node initiating lock recovery for locks on one or more filesystems including in the first service group responsive to the detecting using a first client list of the plurality of client lists, the first client list included in the first service group.

12. The method as recited in claim 11 further comprising storing each of the plurality of client lists in at least one of the one or more filesystems included in the respective service group.

13. The method as recited in claim 11 wherein initiating lock recovery comprises notifying each of the clients in the first client list that the clients should reclaim locks previously granted on at least one filesystem in the first service group.

14. The method as recited in claim 13 wherein notifying each of the clients comprises transmitting one or more server identifiers included in the first service group.

15. The method as recited in claim 13 further comprising:
initiating a period of time for the clients in the first client list to reclaim locks in the filesystems included in the first service group; and
the second node not granting new locks in the filesystems included in the first service group during the period.

16. The method as recited in claim 15 wherein the second node is also acting as a server for one or more filesystems in a second service group of the plurality of service groups, the method further comprising the second node not interrupting locking services for the second service group during the period.

17. The method as recited in claim 16 wherein not interrupting locking services comprises granting a lock in a filesystem within the second service group during the period.

18. The method as recited in claim 15 wherein the first node is also acting as a server for one or more filesystems in a second service group of the plurality of service groups, the method further comprising the first node not interrupting locking services for the second service group during the period.

19. The method as recited in claim 11 wherein the second node is also acting as a server for one or more filesystems in a second service group of the plurality of service groups, the method further comprising the second node not interrupting locking services for the second service group during the period.

20. A computer accessible medium encoded with a plurality of instructions which, when executed in a first node of a plurality of nodes in response to detecting a failure with respect to a first service group of a plurality of service groups in a second node of the plurality of nodes and each of the plurality of service groups including at least one filesystem:
initiate lock recovery for locks on each filesystem in the first service group using a first client list of a plurality of client lists, wherein each of the plurality of client lists is included in a respective service group of the plurality of service groups and identifies clients having at least one lock in at least one filesystem in the respective service group, and wherein the first client list is included in the first service group, wherein a separate client list of the plurality of client lists is included in each respective service group of the plurality of service groups.

21. The computer accessible medium as recited in claim 20 wherein each of the plurality of client lists is stored in the respective service group.

22. The computer accessible medium as recited in claim 20 wherein the plurality of instructions, when executed, initiate lock recovery by notifying each of the clients in the first client list that the clients should reclaim locks previously granted on a filesystem in the first service group.

23. The computer accessible medium as recited in claim 22 wherein notifying each of the clients in the first client lists comprises transmitting one or more server identifiers included in the first service group.

24. The computer accessible medium as recited in claim 22 wherein the plurality of instructions, when executed:
initiate a period of time for the clients in the first client list to reclaim locks on the at least one filesystem in the first service group; and
do not grant new locks on the at least one filesystem in the first service group during the period.

25. The computer accessible medium as recited in claim 24 wherein, if the second node is also acting as a server for one or more filesystems in a second service group of the plurality of service groups, the plurality of instructions, when executed, grant a lock requested by a client on a filesystem in the second service group during the period.

26. The computer accessible medium as recited in claim 20 wherein, if the second node is also acting as a server for one or more filesystems in a second service group of the plurality of service groups, the plurality of instructions, when executed, do not initiate lock recovery for locks on filesystems in the second service group responsive to the fail over of the first service group.

27. A computer accessible medium encoded with a plurality of instructions which, when executed in a first node of a plurality of nodes in response to detecting a failure with respect to a first service group of a plurality of service groups in a second node of the plurality of nodes and each of the plurality of service groups comprises at least one filesystem:

initiate lock recovery for first locks on at least one first filesystem in the first service group, the lock recovery initiated by the first node which is beginning to act as a server for the at least one first filesystem, and wherein the second node was previously acting as the server for the at least one filesystem; and maintain second locks in at least one second filesystem in a second service group of the plurality of service groups during a time period that the first locks in the first service group are recovered.

28. The computer accessible medium as recited in claim 27 wherein the first node is acting as a server for the at least one second filesystem in the second service group.

29. The computer accessible medium as recited in claim 27 wherein a different node of the plurality of nodes is acting as the server for the at least one second filesystem in the second service group.

30. The computer accessible medium as recited in claim 27 wherein the plurality of instructions, when executed:

initiate a period of time for clients to reclaim locks on the at least one first filesystem in the first service group; and do not grant new locks on the at least one first filesystem in the first service group during the period.

31. The computer accessible medium as recited in claim 30 wherein the plurality of instructions, when executed, grant a lock requested by a client on one of the at least one second filesystem included in the second service group during the period.

32. The computer accessible medium as recited in claim 27 wherein the plurality of instructions, when executed, do not interrupt locking services for the second service group.

33. A method comprising:

initiating lock recovery for first locks on one or more first filesystems in a first service group of a plurality of service groups by a first node of a plurality of nodes that is beginning to act as a server the one or more filesystems in response to detecting a failure with respect to the first service group in a second node of the plurality of nodes that was previously acting as the server for the one or more first filesystems; and maintaining second locks on one or more second filesystems in a second service group of the plurality of service groups during a time period that the first locks in the first service group are recovered.

34. The method as recited in claim 33 wherein the first node is acting as a server for the one or more second filesystems in the second service group.

35. The method as recited in claim 33 wherein a different node of the plurality of nodes is acting as the server for the one or more second filesystems in the second service group.

36. The method as recited in claim 33 further comprising:

initiating a period of time for clients to reclaim locks on the one or more first filesystems in the first service group; and not granting new locks on the one or more first filesystems in the first service group during the period.

37. The method as recited in claim 36 further comprising granting a lock requested by a client on a filesystem in the second service group during the period.

* * * * *